United States Patent
Maier

(10) Patent No.: US 10,427,193 B2
(45) Date of Patent: Oct. 1, 2019

(54) METHOD FOR TREATING WASTE

(71) Applicant: Holcim Technology Ltd., Jona (CH)

(72) Inventor: Beat René Maier, Küttigen (CH)

(73) Assignee: Holcim Technology, LTD., Rapperswil-Jona (CH)

( * ) Notice: Subject to any disclaimer, the term of this patent is extended or adjusted under 35 U.S.C. 154(b) by 210 days.

(21) Appl. No.: 15/569,872

(22) PCT Filed: Apr. 8, 2016

(86) PCT No.: PCT/IB2016/000450
§ 371 (c)(1),
(2) Date: Oct. 27, 2017

(87) PCT Pub. No.: WO2016/174513
PCT Pub. Date: Nov. 3, 2016

(65) Prior Publication Data
US 2018/0117649 A1   May 3, 2018

(30) Foreign Application Priority Data

Apr. 30, 2015  (AT) ..................................... 264/2015

(51) Int. Cl.
*B09B 3/00* (2006.01)
*C05F 9/00* (2006.01)
(Continued)

(52) U.S. Cl.
CPC ............ *B09B 3/0083* (2013.01); *B09B 1/004* (2013.01); *B09B 5/00* (2013.01); *C05F 9/00* (2013.01);
(Continued)

(58) Field of Classification Search
CPC ......... B09B 1/004; B09B 3/0083; B09B 5/00; C05F 17/027; C05F 9/00; F26B 25/002;
(Continued)

(56) References Cited

U.S. PATENT DOCUMENTS 5,906,436 A * 5/1999 Cole ...................... B65G 65/06
366/256
6,399,359 B1 * 6/2002 Hofstede ............. C05F 17/0258
435/262.5
(Continued)

FOREIGN PATENT DOCUMENTS

DE     20208885 U1    8/2002
EP      1146027 A1   10/2001
(Continued)

OTHER PUBLICATIONS

International Search Report for PCT/IB2016/000450 dated Sep. 29, 2016; English translation submitted herewith (6 pages).
(Continued)

*Primary Examiner* — Kenneth Rinehart
*Assistant Examiner* — Logan P Jones
(74) *Attorney, Agent, or Firm* — Fitch, Even, Tabin & Flannery LLP

(57) ABSTRACT

In a method for treating waste, in particular domestic waste, comprising the providing of a closed building for receiving the waste, the roof of the building being designed as a semi-permeable membrane, the filling of the building with the waste, the waste being piled into a mound, the performing of a biological drying of the waste with the supply of air, the air exhaust taking place through the semi-permeable membrane, and the discharging of the dried waste from the building, the filling of the building and the performing of the biological drying, and optionally discharging, of the waste are carried out with an unchanged arrangement of the roof, and the filling of the building is carried out by dropping the waste from a continuous conveying device.

16 Claims, 1 Drawing Sheet

Figure 1:
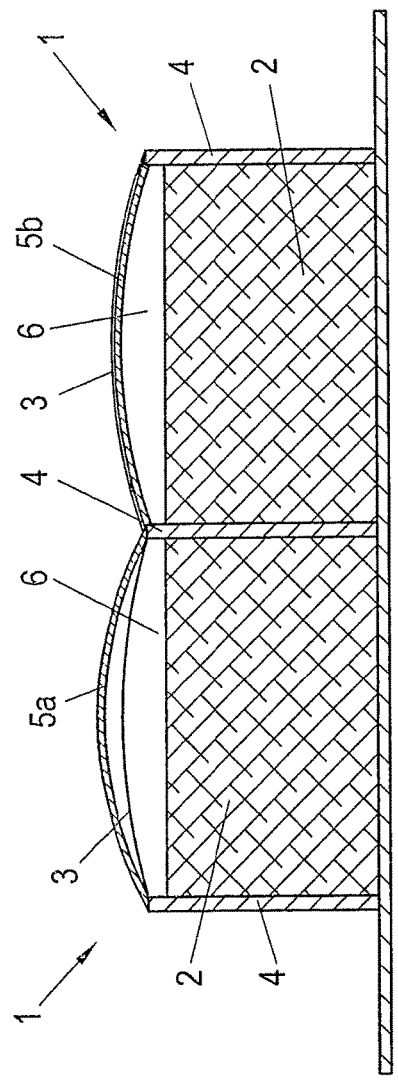

(51) Int. Cl.
*B09B 5/00* (2006.01)
*B09B 1/00* (2006.01)
*F26B 25/10* (2006.01)
*F26B 25/00* (2006.01)
*F26B 3/06* (2006.01)
*C05F 17/02* (2006.01)
*F26B 9/02* (2006.01)

(52) U.S. Cl.
CPC .............. *C05F 17/027* (2013.01); *F26B 3/06* (2013.01); *F26B 9/02* (2013.01); *F26B 25/002* (2013.01); *F26B 25/10* (2013.01); *Y02A 40/214* (2018.01); *Y02P 20/145* (2015.11); *Y02W 30/32* (2015.05); *Y02W 30/43* (2015.05)

(58) Field of Classification Search
CPC ... F26B 25/10; F26B 3/06; F26B 9/02; Y02A 40/214; Y02P 20/145; Y02W 30/32; Y02W 30/43
See application file for complete search history.

(56) References Cited

U.S. PATENT DOCUMENTS

| | | |
|---|---|---|
| 2002/0019045 A1 | 2/2002 | Bisbis |
| 2006/0148071 A1 | 7/2006 | Bauer et al. |
| 2008/0032393 A1 | 2/2008 | Bauer et al. |
| 2008/0051620 A1 | 2/2008 | Deyerling et al. |
| 2008/0064087 A1* | 3/2008 | O'Neill .............. C05F 17/0258 435/290.1 |

FOREIGN PATENT DOCUMENTS

| | | |
|---|---|---|
| EP | 1736461 A1 | 12/2006 |
| FR | 2876399 A1 | 4/2006 |
| WO | 02/00572 A1 | 1/2002 |
| WO | 2004/048719 A1 | 6/2004 |

OTHER PUBLICATIONS

International Preliminary Examination Report (Written Opinion), dated Aug. 4, 2017.

* cited by examiner

METHOD FOR TREATING WASTE

CROSS-REFERENCE TO RELATED APPLICATIONS

This application is a U.S. national phase application filed under 35 U.S.C. § 371 of International Application No. PCT/IB2016/000450, filed Apr. 8, 2016, designating the United States, and claims priority from Austrian Patent Application No. A 264/2015, filed Apr. 30, 2015, and the complete disclosures of which applications are hereby incorporated herein by reference in their entirety for all purposes.

The invention relates to a method for treating waste, in particular domestic waste, including the providing of a closed building for receiving the waste, the roof of the building being designed as a semi-permeable membrane, the filling of the building with the waste, the waste being piled into a mound, the performing of a biological drying of the waste with the supply of air, the air exhaust taking place through the semi-permeable membrane, and the discharging of the dried waste from the building, and a device for carrying out said method.

It has been the endeavor to utilize alternative fuels, i.e. fuels having calorific values lower than that of high-quality natural gas, coal or petroleum, for instance for the cement clinker production process, wherein such alternative fuels are frequently available in the form of waste. Waste is available in particularly large quantities as domestic waste. By domestic waste, a waste mixture originating from private households and comparable establishments is understood. Considering the relevant waste separation regulations, domestic waste is frequently also referred to as domestic residual waste. The material composition of domestic waste differs regionally and seasonally. Domestic waste usually contains varying portions of plastic, fine waste, paper/cardboard, diapers, textiles, glass, metal, composite materials and vegetables. In terms of fuel technology, domestic waste can be subdivided into the components: water, inert materials, fossil fuel matter and organic fuel matter, wherein it should be noted that domestic waste comprises a high portion of organic matter, namely about 30-60% (organic fraction incl. water).

The recycling potential of such waste products in the cement industry has so far been limited because of significant moisture contents if waste products are directly introduced into kiln systems, which, due to the water content, has led to an increased heat demand in the clinker production process for evaporating the water. Moreover, an unfavorably high overall volume of process exhaust gases will result from the significant amounts of introduced water after the evaporation of water, which will in turn involve increased exhaust gas management expenses.

In order to enable the utilization of domestic waste as alternative fuel in the cement industry, pretreatment including drying is therefore necessary. Typically, drying takes place by using high-quality, expensive fuels such as natural gas or diesel, which is, however, disadvantageous from an economic point of view. Alternatively, the waste can be subjected to biological drying.

By biological drying, a process in which domestic waste is aerated and hence penetrated by air so as to aerobically decay is generally understood. In this case, the domestic waste is introduced into a reactor, and the biologically more easily decomposable organic portions of the domestic waste are microbially degraded while feeding oxygen. The decomposition of the organic components by microorganisms is an exothermal reaction causing a temperature increase within the waste. In doing so, only a small fraction of the organic portion of the waste is, however, decomposed so that its energy will be largely maintained and the domestic waste will remain utilizable as high-energy fuel substitute. The biological heat formed during the aerobic decay causes drying of the domestic waste. By means of the energy released during this process, the air flowing through the domestic waste absorbs heat and moisture, thus causing a reduction of the moisture content in the domestic waste. Following biological drying, the domestic waste can be utilized in the cement production process as a $CO_2$-neutral substitute fuel of a high-quality in terms of combustion technology.

Biological drying as an external energy source merely requires power for driving the aeration system, and thus is far more energy-saving and cheaper than the initially mentioned drying methods requiring fossil energy carriers.

Unlike other composting methods, biological drying is aimed to make domestic waste utilizable as a high-quality substitute fuel with as short a residence time as possible in the reactor. In doing so, firstly the energy content of the domestic waste is increased by the removal of water to the largest extent possible, and secondly a major portion of the calorific value of the organic substances is maintained in the waste, since the organic degradation is only minimal.

For such biological drying, a semi-permeable membrane is frequently used to cover the waste piled into a mound, wherein by semi-permeable membrane a membrane that is gas- and vapor-permeable, yet water-tight is meant. The use of a semi-permeable membrane, e.g. a GoreTex® membrane, causes the moist air emerging from the mound to escape outwardly through the membrane while the mound remains protected from rain and other environmental influences, thus ensuring efficient drying. Moreover, the membrane has the effect that the bacteria required for biological drying will remain in the mound and the environment will be protected from odor.

A great number of methods and devices are known for the biological drying of waste.

EP 1146027 A1 describes a device for composting organic wastes, in which the wastes are stacked into a trapezoidal heap, a so-called mound, on a water-proof concrete floor and covered by a GoreTex® membrane during the drying process.

DE 20208885 U1 discloses a rotting plant for waste dumped into a heap on a hard-surfaced ground, said plant comprising a water-repellent and air-permeable tarpaulin for covering the waste. For laterally limiting the waste, the plant further comprises several partition walls, to which the tarpaulin is attached.

EP 1736461 A1 also describes a device for composting organic wastes, in which the wastes are piled into a trapezoidal heap on an impermeable, solid floor and covered by a GoreTex® membrane. The disclosed device comprises several side walls that serve for lateral limitation and for the attachment of the GoreTex® membrane.

In that method, it is to be regarded as disadvantageous that the waste is not protected from rain during the heaping-up of the mound and during the removal of the dried waste. As a result, the appropriate operations can only be performed in rainless periods. In practice, such plants are often additionally covered by roofs, thus involving considerable financial expenses. Besides, the application of the membrane on the mound and the removal of the membrane from the mound after completion of the drying process require cumbersome devices, so that the apparatus expenditure and the costs of such plants are correspondingly high. Moreover, there is the risk of the membrane being mechanically damaged. In addition, access paths between the mounds are necessary, thus considerably increasing the overall surface area of the plant. Another problem resides in the formation of rain puddles on the membrane unless the latter is stretched taut, since the membrane will loose its breathing activity on the spots covered by puddles.

In order to avoid the above-described drawbacks, plants have been proposed in the prior art, in which the membrane does not have to be applied and then removed again, but in which a building with a permanent membrane roof is provided. Such buildings, however, involve the problem of having to take care that the vertical distance between the mound and the membrane roof is not too large. If said vertical distance exceeds 1 to 2 meters, the moisture contained in the air emerging from the mound will condense before being able to penetrate the membrane such that the moisture will remain in the building. Yet, the filling and emptying of the building by conventional wheel loaders, excavators and the like require a certain minimum height of the building; when using such loading devices, it is not possible to heap up the waste to closely below the membrane roof. Consequently, buildings with adjustable membrane roofs have been proposed, said membrane roofs being, for instance, designed to be height-adjustable or openable. The membrane roof is, therefore, raised or folded back for the waste-piling procedure, and then lowered or folded in for the drying procedure. The expenditure involved in a height-adjustable or openable roof construction is, however, high. With openable roof constructions, the material is, moreover, exposed to rainfall during charging and discharging. Due to the problem of puddle formation already addressed above, the existing prior art solutions with fixed structures are always designed to be oblique or arched rather than completely flat, in order to avoid the formation of puddles.

WO 2004/048719 A1 discloses a flexible device for covering organic-containing waste. The device comprises a tarpaulin including a plurality of support elements capable of being liquid-filled or inflated, and waterproof and gas-permeable sheets connected to the support elements. The cover construction in this case is air-tightly mounted to the floor. In the mounted state, the support elements are filled and, together with the gas-permeable sheets, form a three-dimensional, hall-shaped structure accommodating the organic-containing waste. In the lowered state, the support elements are not filled, the watertight and gas-permeable sheet coming to lie directly on the organic-containing waste. The sheet can thus be lifted or lowered as required.

In FR 2876399 A1, a device for biologic drying is described, which comprises two parallel side walls and a retractable roof, said roof including a water-impermeable membrane.

WO 02/00572 A1 discloses a system for drying organic wastes, comprising side walls, a rear wall, a door, and a fixed, inclined roof, said roof being made of a laminate including a semi-permeable membrane. The roof described in WO 02/00572 A1 is, however, designed as a sloping roof, thus resulting in a particularly large free space between the waste, which is piled into a mound, and the roof. This promotes the condensation of water within the building, which, in turn, significantly decelerates the biological drying process. In this solution, a large free space is additionally created by the requirement of loading using transport vehicles to be moved into the building.

It is, therefore, the object of the invention to provide a method and a device by which the above-mentioned drawbacks can be overcome without large expenditures on equipment.

To solve this object, the invention in a method of the initially defined kind provides that the filling of the building and the performing of the biological drying, and optionally discharging, of the waste are carried out with an unchanged arrangement of the roof, and that the filling of the building is carried out by dropping the waste from a continuous conveying device.

In that the filling of the building and the performing of the biological drying, and optionally discharging, of the waste are carried out with an unchanged arrangement of the roof, a complex roof construction including a height-adjustable or openable roof can be obviated and a fixed roof will do. In that the fixed membrane roof does not have to be removed or folded back for the filling procedure and for discharging, the method remains uninfluenced by external conditions such as bad weather. In order to be able with such a configuration to still pile the waste to a sufficient height, i.e. closely below the roof, a continuous conveying device dropping the waste to form a mound is used according to the invention. The delivery end of the continuous conveying device in this case can be readily positioned, or lifted to, closely below the membrane roof such that the required fill level will be readily ensured.

A preferred further development provides that the piling of the waste takes place to such a height of the mound that the distance between the roof and the highest point of the mound is less than 2 m, preferably less than 1.5 m, in particular 20 to 100 cm. A particularly small vertical distance, such as a distance of 1 m or less, is particularly preferred because the waste settles during the drying procedure, and it should be safeguarded that the vertical distance between the mound and the membrane roof would not increase to more than 1.5 m, in particular more than 2 m, during the process.

As already pointed out above, a minimization of the vertical distance between the mound and the roof has a positive effect on the avoidance of condensation phenomena in the interior of the building, the risk of condensation being the smaller the smaller the vertical distance between the mound and the roof is.

In a particularly preferred configuration, the mound is aerated from below during said biological drying. During biological drying, the domestic waste is aerated by air flowing therethrough so as to cause the waste to decay aerobically, the supply of oxygen resulting in the microbial degradation of the biologically more easily decomposable organic portions of the domestic waste. Aeration will be particularly advantageous if the air is supplied from below, i.e. the air outlets of the aerator are provided on the bottom of the plant.

A preferred configuration provides that the semi-permeable membrane of the building is designed to be flexible and is pressed upwardly by the conveying device during the filling of the building. This causes the vertical distance between the mound and the roof of the building to be even more efficiently reduced.

In a preferred manner, the waste is piled at a dumping height substantially equal over the total used floor area of the building. This will, in particular, be accomplished in that the waste according to the invention is piled by dropping or dumping from the continuous conveying device. If the dumping trajectory is selectively influenced by adjusting the speed of the conveying means and/or by adjusting the dumping angle, it will be possible to convey the waste even into the corner or edge regions of the building so as to achieve as uniform a fill level as possible and utilize the volume of the building as efficiently as possible. A uniform fill level, moreover, results in identical aeration conditions everywhere, since the air, which is preferably supplied from below, always flows through the same dumping height.

In a particularly preferred manner, the mound is piled to a height of at least 2 m, in particular at least 3 m.

It is, moreover, preferably provided that the dropping of the waste takes place at the conveying speed of the continuous conveying device. In a particularly preferred configuration, the conveying speed is at least 2 m/s, preferably at least 3 m/s.

A preferred further development provides that the conveying device is retracted as a function of the filling progress within the building. Thus, filling starts on the end farthest away from the entrance of the building, and the conveying device is then gradually moved back as a function of the filling progress, until it can finally be moved out again through the entrance of the building. In addition, the conveying device is able to perform lateral movements or rotational movements in order to ensure uniform filling of the plant.

According to a further aspect, the invention relates to a device comprising a closed building for receiving the waste piled into a mound, the roof of the building being designed as a semi-permeable membrane, a continuous conveying device continuously conveying the waste into the interior of the building, and an aeration device for aerating the mound, characterized in that the roof of the building is designed to be unchangeable in its arrangement and the conveying device is designed such that its delivery end is lower than the roof of the building by a maximum of 2 m, preferably a maximum of 1.5 m, in particular 20 to 100 cm.

The especially small free space between the uppermost point of the mound and the roof of the device largely prevents the condensation of water within the building, thus accelerating the biological drying process.

It is preferably provided that the roof of the building is designed as a flat roof. With a flat roof, the vertical distance between the mound piled at a substantially uniform dumping height and the membrane roof is substantially equal. Thus, zones with an increased vertical distance between the waste and the membrane roof, as they occur for instance with sloping roofs or gabled roofs, will be avoided. The substantially uniform distance between the mound and the roof can, therefore, be more perfectly optimized with a view to reducing the risk of condensation.

Furthermore, it is preferably provided that the conveying device is designed as a belt or screw conveyor. This will ensure continuous conveyance of the waste into the interior of the plant.

It would, furthermore, be conceivable that not only the roof of the building is designed as a semi-permeable membrane, but that even one or several of the side walls of the building are also formed by semi-permeable membranes.

In the following, the invention will be explained in more detail by way of an exemplary embodiment schematically illustrated in the drawing. Therein, FIG. 1 is a sectional view of two variants of the building according to the invention; and FIG. 2 is a sectional view of the building according to the invention plus conveying device.

FIG. 1 depicts a closed building 1 for receiving waste 2 piled into a mound, wherein the roof of the building 1 is designed as a semi-permeable membrane 3, which is attached to the lateral walls 4 of the building 1 and, moreover, supported by a support device 5a, 5b. The support device may be provided either above 5a or below 5b the semi-permeable membrane 3 and, for instance, be configured as a rigid framework or the like. The framework might, for instance, also be formed by flexible rods made, for instance, of fiberglass so as to ensure the desired flexibility, yet while successfully avoiding the formation of puddles by accumulations of rainwater.

The roof of the building is designed to be unchangeable in its arrangement. The free space 6 between the mound 2 and the semi-permeable membrane 3 is small, thus largely preventing the condensation of water within the building 1 and accelerating the biological drying process.

Figure 2:
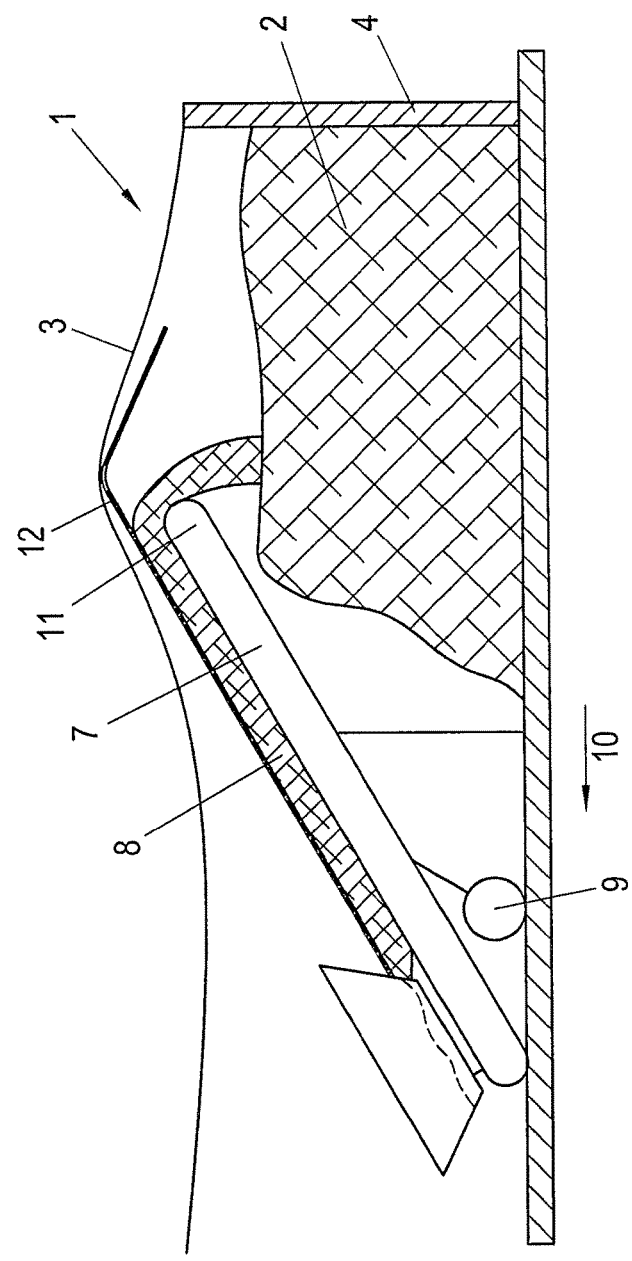

FIG. 2 is a sectional view through the building 1 according to the invention plus the conveying device 7. The conveying device 7 in this case is designed as a belt conveyor. FIG. 2 illustrates how the waste 8 is continuously conveyed by the conveying device into the interior of the building 1, where it is piled into a mound 2. The conveying device is configured such that its delivery end 11 is only slightly lower than the roof 3 of the building 1.

From FIG. 2, it is further apparent that the conveying device 7 comprises a spacer 12, preferably in the form of a bow, extending substantially in parallel with the conveyor belt above the latter and reaching beyond the delivery end 11. As the delivery end 11 of the conveying device 7 is moved upwardly to convey the waste to just below the membrane roof, the spacer 12 presses the flexible membrane 3 upwards to thereby enlarge the space for conveying the waste 8.

The conveying device 7 is designed to be movable and comprises rollers 9 enabling the conveying device 7 to be retracted within the building 1 in the sense of arrow 10 as a function of the filling progress of the building 1.

The invention claimed is:

1. A method for treating waste, in particular domestic waste, comprising the providing of a closed building for receiving the waste, the roof of the building being designed as a gas- and vapor-permeable, yet water-tight membrane, the filling of the building with the waste, the waste being piled into a mound, the performing of a biological drying of the waste with the supply of air, the air exhaust taking place through the gas- and vapor-permeable, yet water-tight membrane, and the discharging of the dried waste from the building, characterized in that the filling of the building (1) and the performing of the biological drying, and optionally discharging, of the waste (8) are carried out with an unchanged arrangement of the roof, and that the filling of the building (1) is carried out by dropping the waste (8) from a conveying device (7) for continuously conveying the waste (8), wherein the piling of the waste (8) takes place to such a height of the mound (2) that the distance between the roof and the highest point of the mound (2) is less than 2 m, and the gas- and vapor-permeable, yet water-tight membrane (3) of the building (1) is designed to be flexible and is pressed upwardly by the conveying device (7) in a locally limited manner during the filling of the building (1).

2. The method according to claim 1, characterized in that the mound (2) is aerated from below during said biological drying.

3. The method according to claim 1, wherein the waste (8) is piled at a dumping height substantially equally over the total floor area of the building (1).

4. The method according to claim 1, wherein the mound (2) is piled to a height of at least 2 m.

5. The method according to claim 1, wherein the dropping of the waste (8) takes place at the conveying speed of the conveying device (7) for continuously conveying the waste (8).

6. The method according to claim 5, wherein the conveying speed is at least 2 m/s.

7. The A method according to claim 1, wherein the conveying device (7) is retracted as a function of the filling progress within the building (1).

8. A device for carrying out the method according to claim 1, comprising a closed building for receiving the waste piled into a mound, the roof of the building being configured as a gas- and vapor-permeable, yet water-tight membrane, a conveying device suitable for continuously conveying the waste into the interior of the building, and an aeration device for aerating the mound, wherein the roof of the building (1) is designed to be unchangeable in its arrangement and the conveying device (7) comprises a spacer (12) extending substantially in parallel with the conveyor belt above the latter and reaching beyond the delivery end (11), and the conveying device (7) is designed such that its delivery end (11) is lower than the roof of the building (1) by a maximum of 2 m, and the gas- and vapor-permeable, yet water-tight membrane (3) is flexible.

9. The device according to claim 8, wherein the roof of the building (1) is designed as a flat roof.

10. The device according to claim 8, wherein the conveying device (7) is designed as a belt or screw conveyor.

11. A method for treating waste comprised of domestic waste, said method comprising:

filling a closed building with the waste, the closed building having a roof comprising a water tight flexible membrane that is gas and vapor permeable, by dropping the waste from a conveying device for continuously conveying the waste into the interior of the closed building, said conveying device comprising a belt or screw conveyor, said conveying device retractable from a conveying position for filling as a function of the filling progress in the interior of the building, wherein the flexible membrane is pressed upwardly by the conveying device in a locally limited manner during the filling of the closed building with the waste, whereby the waste is piled in a mound in the interior of the closed building, wherein a distance between the highest point of the mound and the roof is less than 2 meters, aerating the interior of the closed building to biologically dry the waste to obtain dried waste, and having air exhausting out of the closed building through said membrane, and discharging the dried waste from the building.

12. The method according to claim 11, wherein distance between the highest point of the mound and the roof is less than 1.5 meters.

13. The method according to claim 12, wherein distance between the highest point of the mound and the roof is 20 cm to 100 cm.

14. The method according to claim 1, wherein the mound (2) is piled to a height of at least 3 m.

15. The method according to claim 6, wherein the conveying speed is at least 3 m/s.

16. The device according to claim 8, wherein the spacer (12) is in the form of a bow.

* * * * *